(12) United States Patent
Yi et al.

(10) Patent No.: US 10,862,170 B2
(45) Date of Patent: *Dec. 8, 2020

(54) ELECTROLYTE AND BATTERY

(71) Applicant: CONTEMPORARY AMPEREX TECHNOLOGY CO., LIMITED, Ningde (CN)

(72) Inventors: Tiancheng Yi, Ningde (CN); Chunhua Hu, Ningde (CN); Li Hao, Ningde (CN); Yingjie Zhan, Ningde (CN); Chengdu Liang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/343,326

(22) PCT Filed: Jul. 18, 2017

(86) PCT No.: PCT/CN2017/093311
§ 371 (c)(1),
(2) Date: Oct. 25, 2019

(87) PCT Pub. No.: WO2018/227689
PCT Pub. Date: Dec. 20, 2018

(65) Prior Publication Data
US 2020/0052332 A1   Feb. 13, 2020

(30) Foreign Application Priority Data

Jun. 15, 2017   (CN) .......................... 2017 1 0454471

(51) Int. Cl.
*H01M 10/0567* (2010.01)
*H01M 10/0525* (2010.01)

(52) U.S. Cl.
CPC ... *H01M 10/0567* (2013.01); *H01M 10/0525* (2013.01); *H01M 2300/0025* (2013.01)

(58) Field of Classification Search
CPC combination set(s) only.
See application file for complete search history.

(56) References Cited

U.S. PATENT DOCUMENTS

| | | |
|---|---|---|
| 2014/0057161 A1 | 2/2014 | Kim et al. |
| 2015/0064578 A1 | 3/2015 | Kang et al. |
| (Continued) | | |

FOREIGN PATENT DOCUMENTS

| | | |
|---|---|---|
| CN | 1412225 A | 4/2003 |
| CN | 103078140 B | 4/2015 |
| (Continued) | | |

OTHER PUBLICATIONS

Extended European Search Report on Application No. EP 17913433.3 dated Oct. 7, 2019.

(Continued)

*Primary Examiner* — Miriam Stagg
*Assistant Examiner* — Lilia Nedialkova
(74) *Attorney, Agent, or Firm* — Moser Taboada

(57) ABSTRACT

The present disclosure relates to the field of energy storage materials, and particularly, to an electrolyte and a battery using the electrolyte. The electrolyte contains an additive selected from a group consisting of multi-cyano six-membered N-heterocyclic compounds represented by Formula I-1, Formula I-2 and Formula I-3, and combinations thereof. The addition of the multi-cyano six-membered N-heterocyclic compound as an additive in the electrolyte of the present disclosure can effectively passivate surface activity of the positive electrode material and inhibit oxidation of the electrolyte. The battery using the electrolyte according the present disclosure has good cycle performance at high temperature and high voltage and good storage performance, while gas production of the battery is reduced.

(Continued)

References Cited

U.S. PATENT DOCUMENTS

2015/0244028 A1  8/2015  Utsumi et al.
2017/0069934 A1  3/2017  Kim et al.

FOREIGN PATENT DOCUMENTS

| | | |
|---|---|---|
| CN | 103022556 B | 6/2015 |
| CN | 104852087 A | 8/2015 |
| CN | 104995784 A | 10/2015 |
| CN | 105322223 A | 2/2016 |
| CN | 105489935 A | 4/2016 |
| CN | 105655639 A | 6/2016 |
| JP | H-09213348 A | 8/1997 |
| JP | H-11111332 A | 4/1999 |
| JP | 2001357877 A | 12/2001 |
| JP | 2010044883 A | 2/2010 |
| JP | 2011077016 A | 4/2011 |
| JP | 2012104439 A | 5/2012 |
| WO | WO-2016/159702 A1 | 10/2016 |
| WO | WO-2017118655 A1 * | 7/2017 ............ C23C 18/34 |

OTHER PUBLICATIONS

International Search Report dated Mar. 15, 2018 for PCT Application No. PCT/CN2017/093311.

\* cited by examiner

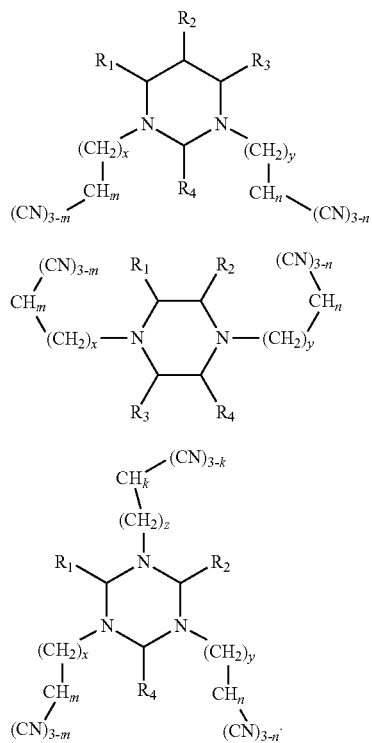

(I-1)

(I-2)

(I-3)

12 Claims, 2 Drawing Sheets

ELECTROLYTE AND BATTERY

CROSS-REFERENCE TO RELATED APPLICATIONS

The present application is based on International Application No. PCT/CN2017/093311, filed on Jul. 18, 2017, which claims priority to Chinese Patent Application No. 201710454471.3, filed on Jun. 15, 2017, the contents of which are incorporated herein by reference in their entireties.

TECHNICAL FIELD

The present disclosure relates to the field of energy storage materials, and particularly, to an electrolyte and a battery using the electrolyte.

BACKGROUND

Lithium-ion batteries are widely used in electric vehicles and consumer electronic products due to their advantages of high energy density, high output power, long cycle life and small environmental pollution. The current demand on lithium-ion batteries still includes: high voltage, high power, long cycle life, long storage life and excellent safety performance.

Most of the current lithium-ion batteries apply an electrolyte system, in which lithium hexafluorophosphate is used as conductive lithium salt and a cyclic carbonate and/or a chain carbonate is used as solvent. However, the above electrolyte system still has many deficiencies. For example, the cycle performance and storage performance of the above electrolyte system need to be improved under a condition of high voltage and high temperature.

The present disclosure aims to overcome the said deficiencies.

SUMMARY

In order to solve the above problems, the inventor conducted intensive researches and found that using a multi-cyano six-membered N-heterocyclic compound as an additive of the electrolyte can effectively inactivate the surface of a positive electrode material, inhibit the positive electrode material to oxidize the electrolyte, while reducing gas production of the battery. Therefore, the cycle performance at high temperature and high voltage and the storage performance of the battery can be improved. The present application is completed based on the above concept.

One purpose of the present disclosure is to provide an electrolyte including an additive. The additive is selected from a group consisting of multi-cyano six-membered N-heterocyclic compounds represented by Formula I-1, Formula I-2 and Formula I-3, and combinations thereof,

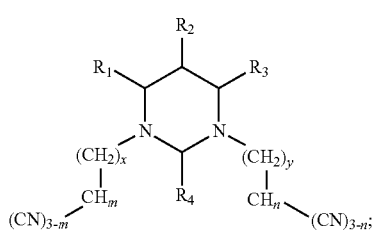

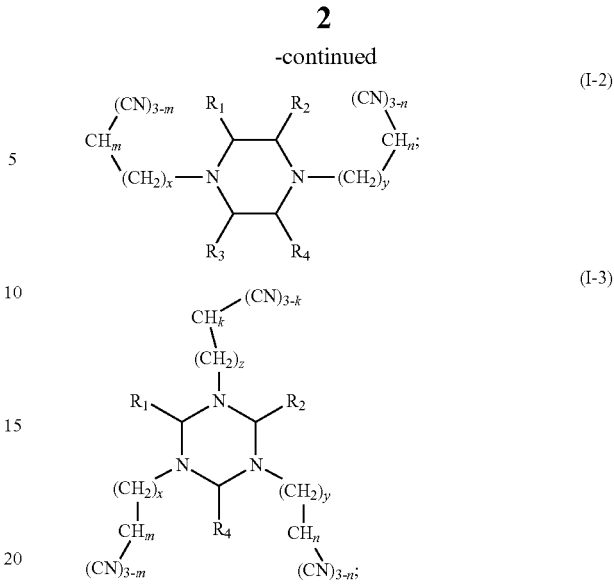

wherein $R_1$, $R_2$, $R_3$ and $R_4$ are each independently selected from a group consisting of hydrogen, halogen, substituted or unsubstituted $C_1$-$C_{12}$ alkyl, substituted or unsubstituted $C_1$-$C_{12}$ alkoxy, substituted or unsubstituted $C_1$-$C_{12}$ amine group, substituted or unsubstituted $C_2$-$C_{12}$ alkenyl, substituted or unsubstituted $C_2$-$C_{12}$ alkynyl, substituted or unsubstituted $C_6$-$C_{26}$ aryl, and substituted or unsubstituted $C_4$-$C_{12}$ heterocyclic group;

the substituent for the above groups, if present, is independently selected from a group consisting of halogen, cyano, $C_1$-$C_6$ alkyl, $C_2$-$C_6$ alkenyl, $C_1$-$C_6$ alkoxy, and combinations thereof;

x, y and z are each an integer independently selected from 0-8; and m, n and k are each an integer independently selected from 0-2.

Another purpose of the present disclosure is to provide a battery. The battery includes a positive electrode plate, a negative electrode plate, a separator disposed between the positive electrode plate and the negative electrode plate, and an electrolyte according to the present disclosure.

The technical solutions of the present disclosure at least have the following beneficial effects:

The addition of the multi-cyano six-membered N-heterocyclic compound as an additive in the electrolyte according to the present disclosure can effectively passivate surface activity of the positive electrode material and inhibit oxidation of the electrolyte. The battery using the electrolyte of the present disclosure has a good cycle performance at high temperature and high voltage and a good storage performance at high temperature, while gas production of the battery is reduced.

DESCRIPTION OF EMBODIMENTS

Figure 1:
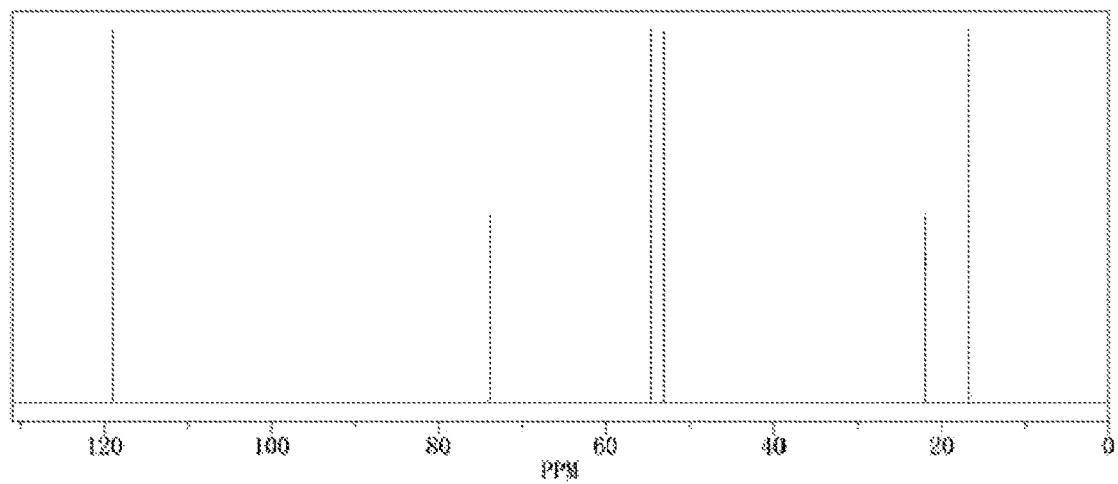
FIG. 1 is a nuclear magnetic resonance carbon spectrum of Compound A2.

In order to clarify invention purpose, technical solutions, and advantages of the present disclosure, the present disclosure will be described in detail below with reference to the embodiments. It should be understood that the embodiments described in the specification merely aim to explain the present disclosure, rather than limiting the present disclosure. Formulations, ratios, etc. mentioned in the embodiments can be selected depending upon actual conditions and requirements.

The electrolyte and battery according to the present disclosure are described in detail as follow.

Firstly, according to a first aspect of the present disclosure, an electrolyte is described as below.

In order to achieve the purposes mentioned above, a first aspect of the embodiments of the present disclosure provides an electrolyte including an organic solvent, an electrolyte salt and an additive. The additive includes a multi-cyano six-membered N-heterocyclic compound.

(Multi-Cyano Six-Membered N-Heterocyclic Compounds)

The multi-cyano six-membered N-heterocyclic compound described in the embodiments of the present disclosure is selected from a group consisting of compounds represented by Formula I-1, Formula I-2, and Formula I-3, and combinations thereof:

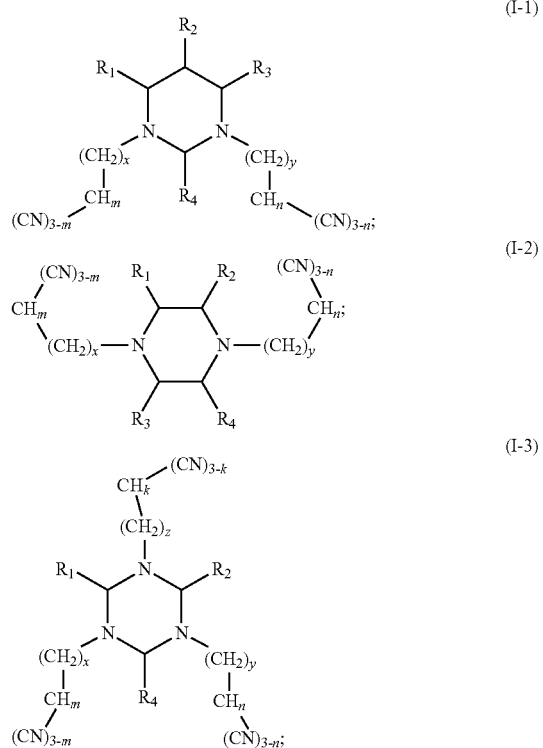

in which $R_1$, $R_2$, $R_3$ and $R_4$ are each independently selected from a group consisting of hydrogen, halogen, substituted or unsubstituted $C_1$-$C_{12}$ alkyl, substituted or unsubstituted $C_1$-$C_{12}$ alkoxy, substituted or unsubstituted $C_1$-$C_{12}$ amine group, substituted or unsubstituted $C_2$-$C_{12}$ alkenyl, substituted or unsubstituted $C_2$-$C_{12}$ alkynyl, substituted or unsubstituted $C_6$-$C_{26}$ aryl, and substituted or unsubstituted $C_4$-$C_{12}$ heterocyclic group;

the substituent for the above groups, if present, is independently selected from a group consisting of halogen, cyano, $C_1$-$C_6$ alkyl, $C_2$-$C_6$ alkenyl, $C_1$-$C_6$ alkoxy, and combinations thereof;

x, y and z are each an integer independently selected from 0-8; and m, n and k are each an integer independently selected from 0-2.

Since the multi-cyano six-membered N-heterocyclic compound have cyanos and the nitrogen atom in each cyano can strongly complexed with transition metals, the multi-cyano six-membered N-heterocyclic compound applied in the electrolyte can be adsorbed on the surface of the positive electrode material to form a loose porous protective film. The porous protective film isolates the surface of the positive electrode material from the electrolyte without affecting normal transportation of lithium ions, reduces the surface activity of the positive electrode material, and meanwhile inhibits a large number of side reactions occurring on the surface, thereby reducing by-products and inhibiting gas production.

Further, although the multi-cyano six-membered N-heterocyclic compound according to the present disclosure is a nitrile-derived compound, a special six-membered N-heterocyclic structure thereof can affect a film forming potential of the cyano and a film forming effect on surface of the positive electrode material, and further can improve electrochemical performance of the entire battery system, such as reducing gas production, increasing cycle life at high temperature and high voltage, etc.

(I) In the embodiments of the present disclosure, the compounds represented by Formula I-1 are multi-cyano pyrimidine compounds.

As an improvement of the compounds represented by Formula I-1, $R_1$, $R_2$, $R_3$ and $R_4$ are each independently selected from a group consisting of hydrogen, halogen, substituted or unsubstituted $C_1$-$C_6$ linear or branched alkyl, substituted or unsubstituted $C_5$-$C_9$ cycloalkyl, substituted or unsubstituted $C_1$-$C_6$ alkoxy, substituted or unsubstituted $C_{1-6}$ amine group, substituted or unsubstituted $C_{2-6}$ alkenyl, substituted or unsubstituted $C_2$-$C_6$ alkynyl, substituted or unsubstituted $C_{6-12}$ aryl, and substituted or unsubstituted $C_4$-$C_{12}$ heterocyclic group. The substituent for the above groups, if present, is halogen.

As an improvement of the compounds represented by Formula I-1, $R_1$, $R_2$, $R_3$ and $R_4$ are each independently selected from a group consisting of hydrogen, halogen, substituted or unsubstituted $C_1$-$C_3$ linear or branched alkyl, substituted or unsubstituted $C_5$-$C_7$ cycloalkyl, substituted or unsubstituted $C_1$-$C_3$ alkoxy, substituted or unsubstituted $C_1$-$C_3$ amine group, substituted or unsubstituted $C_2$-$C_3$ alkenyl, substituted or unsubstituted $C_2$-$C_3$ alkynyl, substituted or unsubstituted $C_6$-$C_8$ aryl, and substituted or unsubstituted $C_4$-$C_7$ heterocyclic group. The substituent for the above groups, if present, halogen.

Each of alkyl, alkenyl and alkynyl can be a chain substituent or a cyclic substituent, and the chain substituent can be either a linear substituent or a branched substituent.

In the compounds represented by Formula I-1, x is preferably an integer selected from 0-6, further preferably an integer selected from 0-4, more preferably an integer selected from 1 or 2; and y is preferably an integer selected from 0-6, further preferably an integer selected from 0-4, more preferably an integer selected from 1 or 2.

As an improvement of the compounds represented by Formula I-1, $R_1$ and $R_3$ are identical; preferably, $R_1$, $R_3$ and $R_4$ are identical.

As an improvement of the compounds represented by Formula I-1, both $R_1$ and $R_3$ are hydrogen; preferably, $R_1$, $R_3$ and $R_4$ are hydrogen. As an improvement of the compounds represented by Formula I-1, $R_1$-$R_4$ all are hydrogen; or $R_1$, $R_3$ and $R_4$ are hydrogen, $R_2$ is selected from a group consisting of halogen, substituted or unsubstituted $C_1$-$C_6$ linear or branched alkyl, and substituted or unsubstituted $C_1$-$C_6$ alkoxy; and the substituent for the above groups, if present, is halogen, preferably fluorine.

As an improvement of the compounds represented by Formula I-1, the compounds represented by Formula I-1 is selected from, but is not limited to, a group consisting of the following compounds:

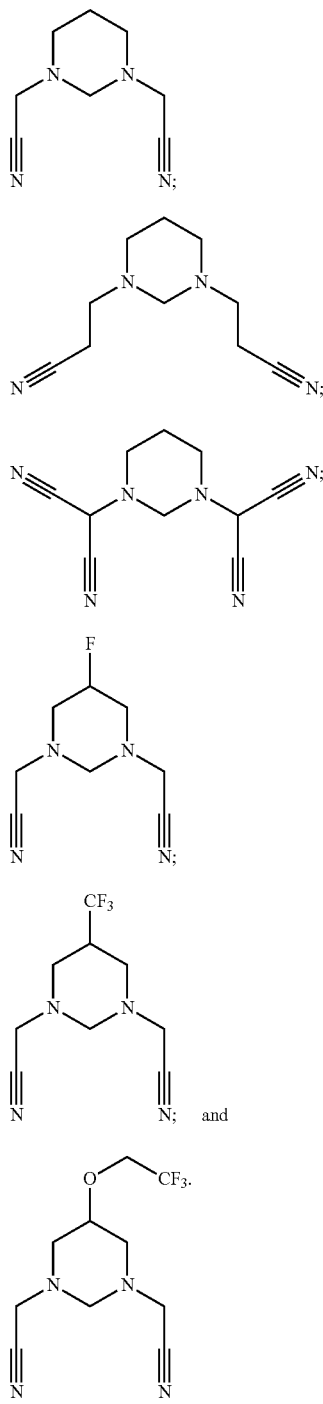

(II) In the embodiments of the present disclosure, the compounds represented by Formula I-2 are multi-cyano piperazine compounds.

As an improvement of the compounds represented by Formula I-2, $R_1$, $R_2$, $R_3$ and $R_4$ are each independently selected from a group consisting of hydrogen, halogen, substituted or unsubstituted $C_1$-$C_6$ linear or branched alkyl, substituted or unsubstituted $C_5$-$C_9$ cycloalkyl, substituted or unsubstituted $C_1$-$C_6$ alkoxy, substituted or unsubstituted $C_1$-$C_6$ amine group, substituted or unsubstituted $C_2$-$C_6$ alkenyl, substituted or unsubstituted $C_2$-$C_6$ alkynyl, substituted or unsubstituted $C_6$-$C_{12}$ aryl, and substituted or unsubstituted $C_4$-$C_{13}$ heterocyclic group; and the substituent for the above groups, if present, is halogen.

As an improvement of the compounds represented by Formula I-2, $R_1$, $R_2$, $R_3$ and $R_4$ are each independently selected from a group consisting of hydrogen, halogen, substituted or unsubstituted $C_1$-$C_3$ linear or branched alkyl, substituted or unsubstituted $C_5$-$C_7$ cycloalkyl, substituted or unsubstituted $C_1$-$C_3$ alkoxy, substituted or unsubstituted $C_1$-$C_3$ amine group, substituted or unsubstituted $C_2$-$C_3$ alkenyl, substituted or unsubstituted $C_2$-$C_3$ alkynyl, substituted or unsubstituted $C_6$-$C_8$ aryl, and substituted or unsubstituted $C_4$-$C_7$ heterocyclic group; and the substituent for the above groups, if present, is halogen.

Each of alkyl, alkenyl and alkynyl can be a chain substituent or a cyclic substituent, and the chain substituent can be either a linear substituent or a branched substituent.

In the compounds represented by Formula I-2, x is preferably an integer selected from 0-6, further preferably an integer selected from 0-4, more preferably an integer selected from 1 or 2; and y is preferably an integer selected from 0-6, further preferably an integer selected from 0-4, more preferably an integer selected from 1 or 2.

As an improvement of the compounds represented by Formula I-2, at least two of $R_1$, $R_2$, $R_3$ and $R_4$ are identical, and preferably, at least three of $R_1$, $R_2$, $R_3$ and $R_4$ are identical.

As an improvement of the compounds represented by Formula I-2, at least two of $R_1$, $R_2$, $R_3$ and $R_4$ are hydrogen, and preferably, at least three of $R_1$, $R_2$, $R_3$ and $R_4$ are hydrogen.

As an improvement of the compounds represented by Formula I-2, $R_1$ to $R_4$ all are hydrogen; or at least three of $R_1$, $R_2$, $R_3$ and $R_4$ are hydrogen and the remaining one of $R_1$, $R_2$, $R_3$ and $R_4$ is selected from a group consisting of halogen, substituted or unsubstituted $C_1$-$C_6$ linear or branched alkyl, and substituted or unsubstituted $C_1$-$C_6$ alkoxy; and the substituent for the above groups, if present, is halogen, and preferably fluorine.

As an improvement of the compounds represented by Formula I-2, the compounds represented by Formula I-2 is selected from, but not limited to, a group consisting of the following compounds:

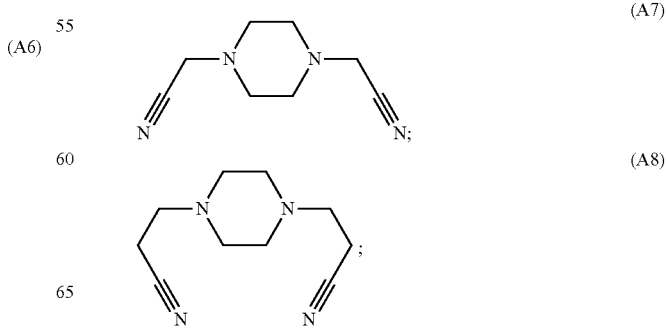

-continued

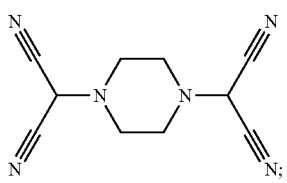
(A9)

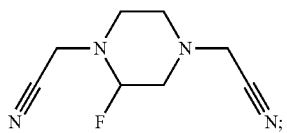
(A10)

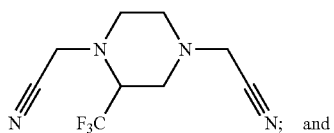
(A11) and

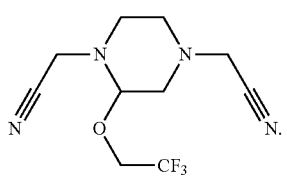
(A12)

(III) In the embodiments of the present disclosure, the compounds represented by Formula I-3 are multi-cyano-s-triazine compounds.

As an improvement of the compounds represented by Formula I-3, $R_1$, $R_2$ and $R_3$ are each independently selected from a group consisting of hydrogen, halogen, substituted or unsubstituted $C_1$-$C_6$ linear or branched alkyl, substituted or unsubstituted $C_5$-$C_9$ cycloalkyl, substituted or unsubstituted $C_1$-$C_6$ alkoxy, substituted or unsubstituted $C_1$-$C_6$ amine group, substituted or unsubstituted $C_2$-$C_6$ alkenyl, substituted or unsubstituted $C_2$-$C_6$ alkynyl, substituted or unsubstituted $C_6$-$C_{12}$ aryl, and substituted or unsubstituted $C_4$-$C_{13}$ heterocyclic group; and the substituent for the above groups, if present, is halogen.

As an improvement of the compounds represented by Formula I-3, $R_1$, $R_2$ and $R_3$ are each independently selected from a group consisting of hydrogen, halogen, substituted or unsubstituted $C_1$-$C_3$ linear or branched alkyl, substituted or unsubstituted $C_5$-$C_7$ cycloalkyl, substituted or unsubstituted $C_1$-$C_3$ alkoxy, substituted or unsubstituted $C_1$-$C_3$ amine group, substituted or unsubstituted $C_2$-$C_3$ alkenyl, substituted or unsubstituted $C_2$-$C_3$ alkynyl, substituted or unsubstituted $C_6$-$C_8$ aryl, and substituted or unsubstituted $C_4$-$C_7$ heterocyclic group; and the substituent for the above groups, if present, is halogen.

Each of alkyl, alkenyl and alkynyl can be a chain substituent or a cyclic substituent, and the chain substituent can be either a linear substituent or a branched substituent.

In the compounds represented by Formula I-3, x is preferably an integer selected from 0-6, further preferably an integer selected from 0-4, more preferably an integer selected from 1 or 2; and y is preferably an integer selected from 0-6, further preferably an integer selected from 0-4, more preferably an integer selected from 1 or 2.

As an improvement of the compounds represented by Formula I-3, at least two of $R_1$, $R_2$ and $R_3$ are identical.

As an improvement of the compounds represented by Formula I-3, at least two of $R_1$, $R_2$ and $R_3$ are hydrogen.

As an improvement of the compounds represented by Formula I-3, $R_1$, $R_2$ and $R_3$ are hydrogen; or at least two of $R_1$, $R_2$ and $R_3$ are hydrogen, and the remaining one of $R_1$, $R_2$ and $R_3$ is selected from a group consisting of halogen, substituted or unsubstituted $C_1$-$C_6$ linear or branched alkyl, and substituted or unsubstituted $C_1$-$C_6$ alkoxy; and the substituent for the above groups, if present, is halogen, and preferably fluorine.

As an improvement of the compounds represented by Formula I-3, the compounds represented by Formula I-3 is selected from, but not limited to, a group consisting of the following compounds:

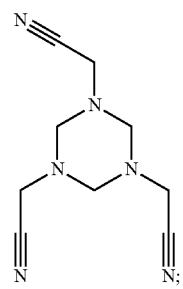
(A13)

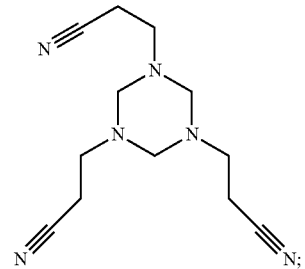
(A14)

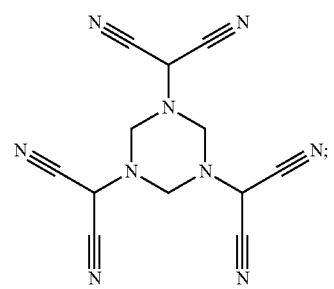
(A15)

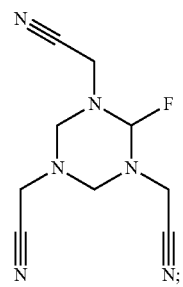
(A16)

-continued

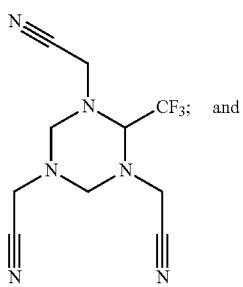 (A17)

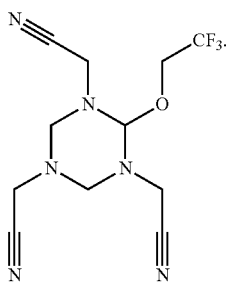 (A18)

As an improvement of the electrolyte in the embodiments of the present disclosure, the multi-cyano six-membered N-heterocyclic compound is selected from, but not limited to, a group consisting of the following compounds:

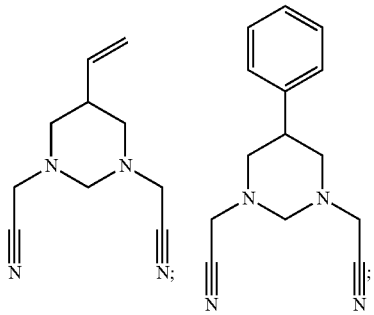

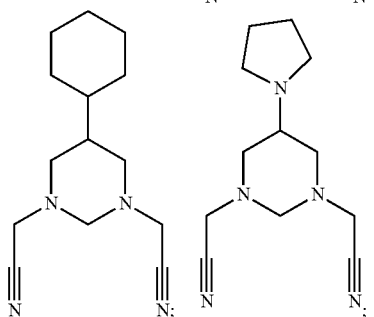

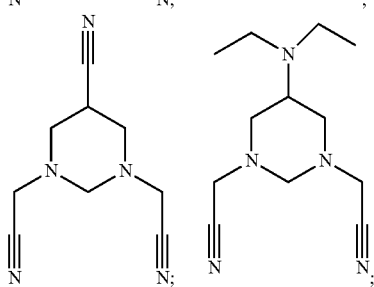

-continued

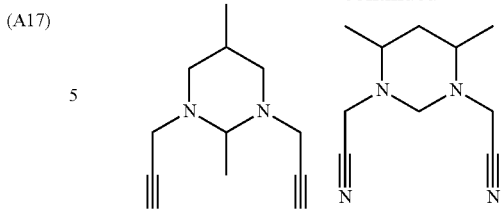

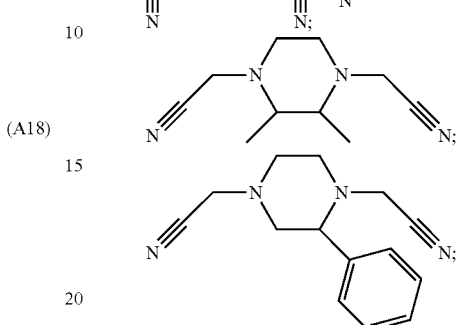

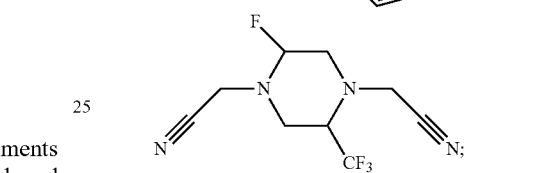

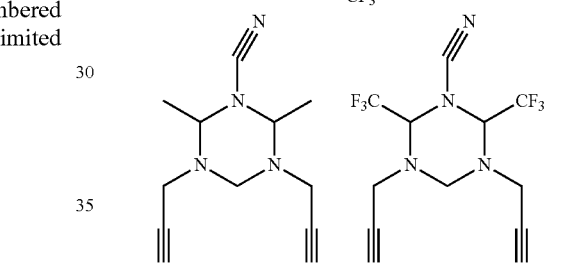

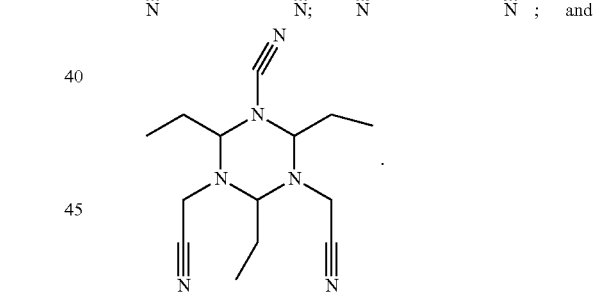

As an improvement of the electrolyte in the embodiments of the present disclosure, the electrolyte contains 0.001% to 10% by weight of the multi-cyano six-membered N-heterocyclic compound. If the content of the multi-cyano six-membered N-heterocyclic compound is too low, the improvement effect on the electrolyte will be not significant. If the content of the multi-cyano six-membered N-heterocyclic compound is too high, a complex layer to be formed will have a great thickness, which significantly increases impedances of the positive and negative electrodes and thus leads to a deterioration of battery performance.

In the embodiments of the present disclosure, the electrolyte contains at most 10%, 9%, 8%, 7%, 6%, 5%, 4.5%, 4%, 3.5%, 3%, 2%, 1% or 0.8% by weight of the multi-cyano six-membered N-heterocyclic compound, and at least 0.001%, 0.005%, 0.01%, 0.05%, 0.1%, 0.3%, 0.5% or 0.6% by weight of the multi-cyano six-membered N-heterocyclic compound. More preferably, the electrolyte contains 0.1% to 3.5% by weight of the multi-cyano six-membered N-heterocyclic compound.

(Additives A)

In the embodiments of the present disclosure, the electrolyte can further contain another additive as additive A, and suitable examples of the additive A include the following compounds (a) to (o).

(a) Unsaturated Bond-Containing Cyclic Carbonate Compound

The unsaturated bond-containing cyclic carbonate compound is selected from a group consisting of compounds represented by Formula II-0 and combinations thereof;

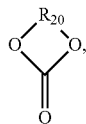
(II-0)

in which, $R_{20}$ is alkenyl-substituted $C_1$-$C_6$ alkylene, or substituted or unsubstituted $C_2$-$C_6$ alkenylene.

The unsaturated bond-containing cyclic carbonate compound is selected a group consisting of the following compounds and combinations thereof:

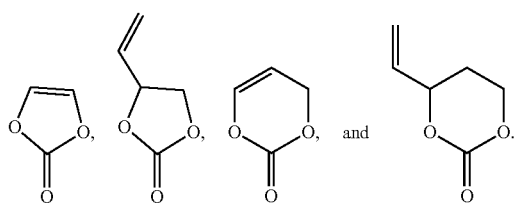

(b) Halogenated Cyclic Carbonate Compound

The halogenated cyclic carbonate compound is selected from a group consisting of compounds represented by Formula II-1 and combinations thereof;

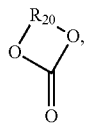
(II-1)

in which, $R_{21}$ is halogen-substituted $C_1$-$C_6$ alkylene, or halogen-substituted $C_2$-$C_6$ alkenylene.

The halogenated cyclic carbonate compound is selected from a group consisting of fluoroethylene carbonate (abbreviated as FEC), fluoropropylene carbonate (abbreviated as FPC), and trifluoropropylene carbonate (abbreviated as TFPC).

(c) Sulfate Compound

The sulfate compound is preferably a cyclic sulfate compound, and the cyclic sulfate compound is selected from a group consisting of compounds represented by Formula II-2, and combinations thereof;

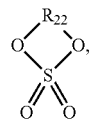
(II-2)

in which $R_{22}$ is selected from a group consisting of substituted or unsubstituted $C_1$-$C_6$ alkylene, and substituted or unsubstituted $C_2$-$C_6$ alkenylene; and the substituent for the above groups, if present, is halogen, $C_1$-$C_3$ alkyl, or $C_2$-$C_4$ alkenyl.

Further preferably, $R_{22}$ is selected from a group consisting of substituted or unsubstituted $C_1$-$C_4$ alkylene, and substituted or unsubstituted $C_2$-$C_4$ alkenylene; and the substituent for the above groups, if present, is halogen, $C_1$-$C_3$ alkyl, or $C_2$-$C_4$ alkenyl.

The cyclic sulfate compound is selected from a group consisting of ethylene sulfate (abbreviated as DTD), trimethylenesulfate (abbreviated as TMS), 4-methyl-1,3,2-dioxathiolane-2,2-dioxide (abbreviated as PLS), shown below, and combinations thereof:

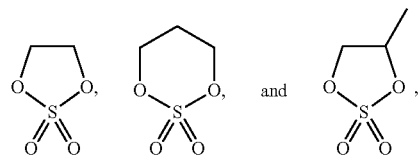

As an improvement of the electrolyte of the present disclosure, the cyclic sulfate compound is selected from a group consisting of the following compounds:

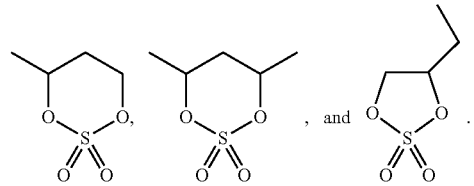

(d) Sultone Compound

The sultone compound is selected from a group consisting of compounds represented by Formula II-3, and combinations thereof:

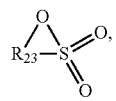
(II-3)

in which $R_{23}$ is selected from a group consisting of substituted or unsubstituted $C_1$-$C_6$ alkylene, and substituted or unsubstituted $C_2$-$C_6$ alkenylene; and the substituent for the above groups, if present, is halogen, $C_1$-$C_3$ alkyl, or $C_2$-$C_4$ alkenyl.

Specifically, the sultone compound is selected from a group consisting of 1,3-propane sultone (abbreviated as PS), prop-1-ene-1,3-sultone (abbreviated as PES), as shown below, and combinations thereof,

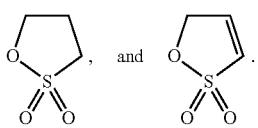

The sultone compound can also be selected from a group consisting of the following compounds:

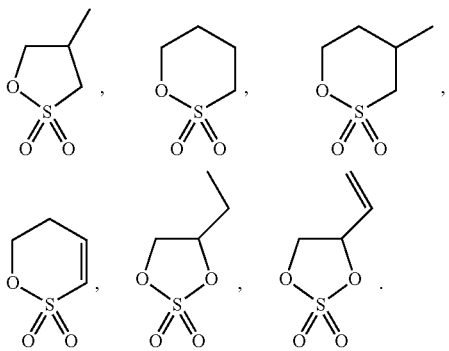

(e) Disulphonic Acid Compound

The disulphonic acid compound is a compound containing two sulfonic acid groups, and preferably is selected from a group consisting of methylene disulfonate compounds. Specifically, the disulphonic acid compound is selected from a group consisting of compounds represented by Formula II-4, and combinations thereof;

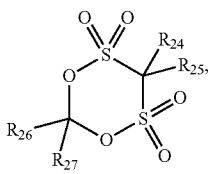

(II-4)

in which $R_{24}$, $R_{25}$, $R_{26}$, and $R_{27}$ are each independently selected from a group consisting of hydrogen, halogen, substituted or unsubstituted $C_1$-$C_{10}$ alkyl, and substituted or unsubstituted $C_2$-$C_{10}$ alkenyl; and the substituent for the above groups, if present, is halogen, $C_1$-$C_3$ alkyl, or $C_2$-$C_4$ alkenyl.

The methylene disulfonate compound can be methylene methanedisulfonate (abbreviated as MMDS);

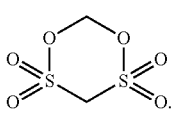

The methylene disulfonate compound can also be selected from a group consisting of the 3-methyl-methylene methanedisulfonate, compounds having the following structures, and combinations thereof:

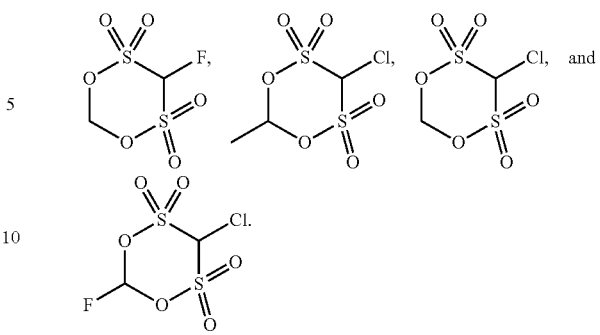

(f) Sulfite Compound

The sulfite compound is a cyclic sulfite compound, and is selected from a group consisting of compounds represented by Formula II-5, and combinations thereof;

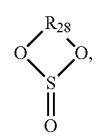

(II-5)

in which $R_{28}$ is selected from a group consisting of substituted or unsubstituted $C_1$-$C_6$ alkylene, or substituted or unsubstituted $C_2$-$C_6$ alkenylene; and the substituent for the above groups, if present, is halogen, $C_1$-$C_3$ alkyl, or $C_2$-$C_4$ alkenyl.

The sulfite compound can be selected from a group consisting of ethylene sulfite (abbreviated as ES), propylene sulfite (abbreviated as PS), and butylene sulfite (abbreviated as BS).

(g) Nitrile Compound

The nitrile compound can be selected from a group consisting of acetonitrile, propionitrile, butanedinitrile, pentanedinitrile, hexanedinitrile, pentanedinitrile, octanedinitrile, decanedinitrile, combinations thereof.

Preferably, the nitrile compound is selected from a group consisting of butanedinitrile, pentanedinitrile, hexanedinitrile, pentanedinitrile, and combinations thereof.

(h) Aromatic Compound

The aromatic compound can be selected from a group consisting of phenylcyclohexane, fluorophenylcyclohexane compounds (1-fluoro-2-phenylcyclohexane, 1-fluoro-3-phenylcyclohexane, or 1-fluoro-4-phenylcyclohexane), aromatic compounds having a branched alkyl, such as tert-butylbenzene, tert-amylbenzene, and 1-fluoro-4-tert-butylbenzene, biphenyl, terphenyl (ortho-position, meta-position, para-position), biphenyl ether, fluobenzene, difluorobenzene (ortho-position, meta-position, para-position), anisole, 2,4-difluoroanisole, and partially hydrogenated terphenyl (1,2-diphenylcyclohexane, 2-phenyldicyclohexyl, 1,2-diphenyl cyclohexane, 2-cyclohexyl biphenyl).

Preferably, the aromatic compound is selected from a group consisting of biphenyl, terphenyl (ortho-position, meta-position, para-position), fluobenzene, phenylcyclohexane, tert-butylbenzene, tert-amylbenzene, and combinations thereof. More preferably, the aromatic compound is selected from a group consisting of biphenyl, o-terphenyl, fluobenzene, phenylcyclohexane, tert-amylbenzene, and combinations thereof.

(i) Isocyanate Compound

The isocyanate compound is selected from a group consisting of methyl isocyanate, ethyl isocyanate, butyl isocyanate, phenyl isocyanate, tetramethylene diisocyanate, hexamethylene diisocyanate, octamethylene diisocyanate, 1,4-phenylene diisocyanate, arcylic acid 2-isocyanatoethyl ester, metharcylic acid 2-isocyanatoethyl ester, and combinations thereof.

The isocyanate compound is preferably selected from a group consisting of hexamethylene diisocyanate, octamethylene diisocyanate, arcylic acid 2-isocyanatoethyl ester, metharcylic acid 2-isocyanatoethyl ester, and combinations thereof.

(j) Phosphazene Compound

Examples of the phosphazene compound include cyclic phosphazene compounds, such as methoxy(pentafluoro)cyclotriphosphazene, ethoxy(pentafluoro)cyclotriphosphazene, phenoxy(pentafluoro)cyclotriphosphazene, and ethoxy(heptafluoro)cyclotetraphosphazene, etc.

Preferable examples of the phosphazene compound include methoxy(pentafluoro)cyclotriphosphazene, ethoxy(pentafluoro)cyclotriphosphazene, and phenoxy(pentafluoro)cyclotriphosphazen. More preferable examples include methoxy(pentafluoro)cyclotriphosphazene, and ethoxy(pentafluoro)cyclotriphosphazene.

(k) Cyclic Anhydride Compound

Examples of the cyclic anhydride compound include: chain-like carboxylic anhydrides, such as acetic anhydride, propionic anhydride, etc.; and cyclic anhydrides, such as succinic anhydride, maleic anhydride, 2-allylsuccinic anhydride, glutaric anhydride, itaconic anhydride, and 3-sulfopropionic anhydride, etc.

Preferable examples of the cyclic anhydride compound include: succinic anhydride, maleic anhydride, and 2-allylsuccinic anhydride. More preferable examples of the cyclic anhydride compound include: succinic anhydride and 2-allylsuccinic anhydride.

(l) Phosphite Ester Compound

The phosphite ester compound can be a silane phosphite ester compound, and specifically, is selected from a group consisting of compounds represented by Formula II-6, and combinations thereof;

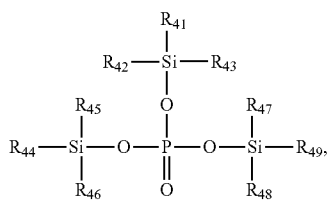
(II-6)

in which $R_{31}$, $R_{32}$, $R_{33}$, $R_{34}$, $R_{35}$, $R_{36}$, $R_{37}$, $R_{38}$, and $R_{39}$ are each independently a substituted or unsubstituted $C_1$-$C_6$ alkyl; and the substitute for the above groups, if present, is halogen.

The silane phosphite ester compound can be selected from a group consisting of the following compounds:

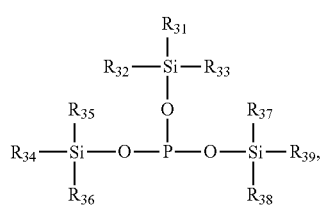

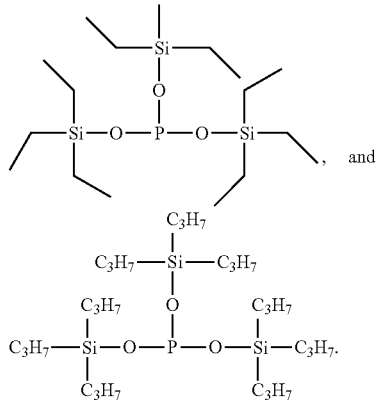, and $$\begin{array}{c} C_3H_7 \\ | \\ C_3H_7-Si-C_3H_7 \\ C_3H_7 \quad O \quad C_3H_7 \\ | \quad \quad | \quad \quad | \\ C_3H_7-Si-O-P-O-Si-C_3H_7. \\ | \quad \quad \quad \quad | \\ C_3H_7 \quad \quad \quad C_3H_7 \end{array}$$

(m) Phosphate Ester Compound

The phosphate ester compound can be a silane phosphate ester compound, and specifically, is selected from a group consisting of compounds represented by Formula II-7, and combinations thereof;

$$\begin{array}{c} R_{41} \\ | \\ R_{42}-Si-R_{43} \\ R_{45} \quad O \quad R_{47} \\ | \quad \quad \| \quad \quad | \\ R_{44}-Si-O-P-O-Si-R_{49}, \\ | \quad \quad \| \quad \quad | \\ R_{46} \quad O \quad R_{48} \end{array}$$
(II-7)

in which $R_{41}$, $R_{42}$, $R_{43}$, $R_{44}$, $R_{45}$, $R_{46}$, $R_{47}$, $R_{48}$, and $R_{49}$ are each independently a substituted or unsubstituted $C_1$-$C_6$ alkyl; and the substitute for the above groups, if present, is halogen.

The silane phosphate ester compound can be selected from a group consisting of the following compounds, and combinations thereof:

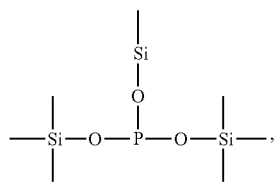

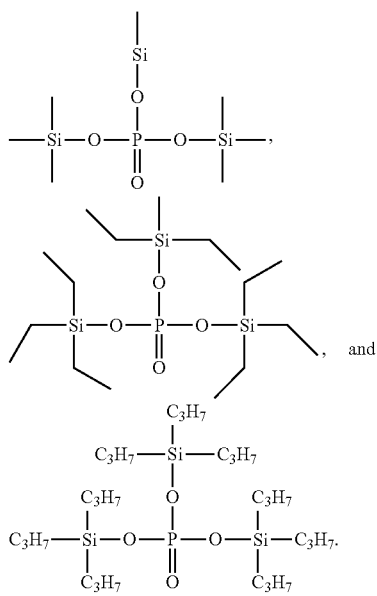

(n) Boric Acid Ester Compound

The boric acid ester compound is a silane borate ester compound, and is specifically selected from a group consisting of compounds represented by Formula II-8, and combinations thereof:

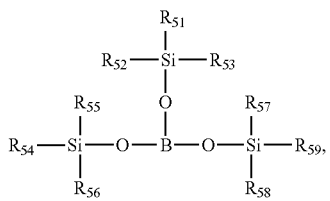

(II-8)

in which $R_{51}$, $R_{52}$, $R_{53}$, $R_{54}$, $R_{55}$, $R_{56}$, $R_{57}$, $R_{58}$, and $R_{59}$ are each independently a substituted or unsubstituted $C_1$-$C_6$ alkyl; and the substitute for the above groups, if present, is halogen.

The silane borate ester compound can also be selected from a group consisting of the following compounds, and combinations thereof:

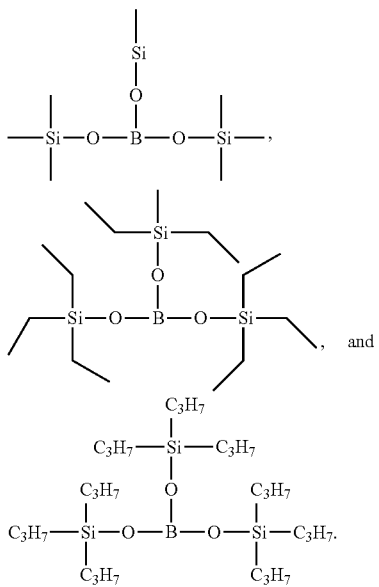

(o) Carboxylic Acid Ester

The carboxylic acid ester can be selected from a group consisting of chain-like carboxylic acid esters and cyclic carboxylic acid esters. The chain-like carboxylic acid esters and the cyclic carboxylic acid esters may include an unsaturated bond or a halogen atom.

The carboxylic acid ester is preferably selected from a group consisting of ethyl acetate (abbreviated as EA), methyl butyrate (abbreviated as MB), ethyl butyrate (abbreviated as EB), ethyl trifluoroacetate (abbreviated as TFEA), trifluoroethyl acetate (abbreviated as ETFA), methyl pentafluoropropionate (abbreviated as MPFP), and combinations thereof.

As an improvement of the electrolyte of the present disclosure, the electrolyte contains 0.01% to 30% by weight of the additive A.

In the Formula I-1, Formula I-2, or Formula I-3 in the embodiments of the present disclosure:

$C_1$-$C_{12}$ alkyl is alkyl having 1 to 12 carbon atoms, and can be a chain alkyl or a cycloalkyl; hydrogen on a ring of cycloalkyl can be substituted by alkyl; a preferable lower limit of a number of carbon atoms of alkyl is 1, 2, 3, 4, or 5; and a preferable upper limit of the number of carbon atoms of alkyl is 3, 4, 5, 6, 8, 10, or 12. Preferably, alkyl having 1-10 carbon atoms is selected; more preferably, a chain alkyl having 1-6 carbon atoms or a cycloalkyl having 3-8 carbon atoms is selected; and most preferably, a chain alkyl having 1-4 carbon atoms or a cycloalkyl having 5-7 carbon atoms is selected. Examples of alkyl include: methyl, ethyl, n-propyl, iso-propyl, n-butyl, iso-butyl, sec-butyl, tert-butyl, n-amyl, iso-amyl, neo-amyl, hexyl, 2-methyl-amyl, 3-methyl-amyl, 1,1,2-trimethylpropyl, 3,3,-dimethyl-butyl, heptyl, 2-heptyl, 3-heptyl, 2-methylhexyl, 3-methylhexyl, iso-heptyl, octyl, nonyl, and decyl.

Alkoxy is the above-mentioned alkyl having 1-12 carbon atoms and having oxygen atom. Preferably, alkoxy having 1-10 carbon atoms is selected; more preferably, alkoxy having 1-6 carbon atom is selected; and most preferably, alkoxy having 1-4 carbon atoms is selected. Examples of alkoxy can include: methoxyl, ethoxy, propyloxy, iso-propoxy, butoxy, sec-butoxy, tert-butoxy, pentyloxy, iso-pentyloxy, cyclopentyloxy, and cyclohexyloxy.

$C_2$-$C_{12}$ alkenyl is alkenyl containing 2-12 carbon atoms, and can be a cyclic alkenyl or a chain alkenyl. The alkenyl preferably contains only one double-bond. A preferable lower limit of a number of carbon atoms of alkenyl is 3, 4, or 5, and a preferable upper limit thereof is 3, 4, 5, 6, 8, 10, or 12. Preferably, alkenyl containing 2-10 carbon atoms is selected; more preferably, alkenyl containing 2-6 carbon atoms is selected; and most preferably, alkenyl containing 2-5 carbon atoms is selected. Examples of the alkenyl include: vinyl, allyl, isopropenyl, pentenyl, cyclohexenyl, cycloheptenyl, and cyclooctenyl.

$C_1$-$C_{12}$ amine group is amine group having 1-12 carbon atoms, and is

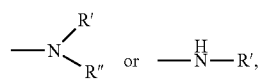

where R' and R" are each independently alkyl containing 1-12 carbon atoms.

$C_2$-$C_{12}$ alkynyl is alkynyl having 2-12 atoms, and can be a cyclic alkynyl or a chain alkynyl. Alkynyl preferably contains only one triple bond. A preferable lower limit of a number of carbon atoms of alkynyl is 3, 4, or 5, and a preferable upper limit thereof is 3, 4, 5, 6, 8, 10, or 12. Preferably, alkynyl containing 2-10 carbon atoms is selected; more preferably, alkynyl containing 2-6 carbon atoms; and most preferably, alkynyl containing 2-5 carbon atoms is selected. Examples of the alkynyl include: acetenyl, propargyl, isopropynyl, pentynyl.

$C_6$-$C_{26}$ aryl is aryl having 6-26 carbon atoms, for example, phenyl, phenylalkyl, aryl containing at least one phenyl such as biphenyl, and polycyclic aryl such as naphthyl, anthryl, and phenanthryl; the biphenyl and the polycyclic aryl can be substituted by alkyl or alkenyl. Preferably, aryl having 6-16 carbon atoms is selected; more preferably, aryl containing 6-14 carbon atoms is selected; and most preferably, an aryl containing 6-9 carbon atoms is selected. Examples of the aryl include: phenyl, benzyl, biphenyl, p-tolyl, o-tolyl, m-tolyl.

$C_4$-$C_{12}$ heterocyclic group is a heterocyclic group containing having 4-12 carbon atoms, a heteroatom thereof can be oxygen, nitrogen, sulfur, phosphorus, boron, etc.; and a heterocyclic ring thereof can be a hetero alicyclic ring or a hetero aromatic ring, and can be a five-membered or six-membered heterocyclic ring or a benzoheterocyclic ring. Preferably, a heterocyclic group having 4-10 carbon atoms is selected; and more preferably, a heterocyclic group having 4-7 carbon atoms is selected. Specific examples include: furyl, thienyl, pyrrolyl, thiazolyl, imidazolyl, pyridyl, pyrazinyl, pyrimidyl, pyridazinyl, indolyl, quinolyl, etc.

Halogen is fluorine, chlorine, or bromine, and fluorine is preferable.

In the Formula II-0 to Formula II-8 in the embodiments of the present disclosure:

$C_1$-$C_6$ alkylene is a linear or branched alkylene having 1-6 carbon atoms; a preferable lower limit of a number of carbon atoms of alkylene is 2 or 3, and a preferable upper limit thereof is 4, 5, or 6. Preferably, alkylene having 1-4 carbon atoms is selected. Examples of alkyl include methylene, ethylene, propylidene, iso-propylidene, butylidene, iso-butylidene, sec-butylidene, pentylidene, hexylidene.

$C_2$-$C_6$ alkenylene is a linear or branched alkenylene having 2-6 carbon atoms, and preferably contains only one double bond. A preferable lower limit of a number of carbon atoms of alkenylene is 3 or 4, and a preferable upper limit thereof is 3, 4, 5, or 6. Preferably, alkenylene containing 2-5 carbon atoms is selected. Examples of the alkenylene include: vinylidene, propylidene, isopropylidene, butenylidene, and pentenylidene.

Halogen is fluorine, chlorine, or bromine, and fluorine is preferable.

(Organic Solvent)

The organic solvent used in the electrolyte of the embodiments of the present disclosure can be preferably selected from the group consisting of cyclic carbonate, chain ester, lactone, ether, amide, and combinations thereof. In order to further improve the cycle performance at high temperature and high voltage, and the storage performance at high temperature, the electrolyte preferably contains cyclic carbonate and chain carbonate.

The term "chain ester" used herein is a concept including both chain carbonate and chain carboxylic acid ester.

The cyclic carbonate is selected from a group consisting of cyclic carbonate having a C—C unsaturated bond, such as ethylene carbonate (abbreviated as EC), propylene carbonate (abbreviated as PC), 1,2-butylene carbonate, 2,3-butylene carbonate, vinylene carbonate (abbreviated as VC), vinylethylene carbonate (abbreviated as VEC), and 4-acetenyl-1,3-dioxacyclopentane-2-ketone (abbreviated as EEC), etc.; cyclic carbonate having fluorine, such as 4-fluoro-1,3-dioxacyclopentane-2-ketone (abbreviated as FEC), trans- or cis-4,5-difluoro-1,3-dioxacyclopentane-2-ketone (abbreviated below as "DFEC"); and combinations thereof. The cyclic carbonate is preferably selected from a group consisting of ethylene carbonate, propylene carbonate, 4-fluoro-1,3-dioxacyclopentane-2-ketone, vinylene carbonate, and 4-acetenyl-1,3-dioxacyclopentane-2-ketone (abbreviated as EEC).

Examples of the chain carbonates include: asymmetric chain carbonate, such as ethyl methyl carbonate (abbreviated as MEC), methyl propyl carbonate (abbreviated as MPC), methyl isopropyl carbonate (abbreviated as MIPC), methyl butyl carbonate, and ethyl propyl carbonate; symmetrical chain carbonate, such as dimethyl carbonate (abbreviated as DMC), diethyl carbonate (abbreviated as DEC), dipropyl carbonate, and dibutyl carbonate; and chain carboxylic acid ester, such as neovalerates (methyl neovalerate, ethyl neovalerate, propyl pivalate, etc.), methyl propionate, ethyl propionate, methyl acetate, and ethyl acetate.

Other suitable examples of the organic solvent may include: cyclic ester, such as tetrahydrofuran, 2-methyl tetrahydrofuran, 1,4-dioxane, etc.; chain ester, such as 1,2-dimethoxyethane, 1,2-diethoxyethane, 1,2-dibutoxyethane, etc.; amide, such as dimethylformamide; sulfone such as sulfolane; and lactones such as γ-butyrolactone, γ-valerolactone, and α-angelica lactone.

(Salt for Electrolyte)

The following lithium slats are suitable examples of the salt for electrolyte of the present disclosure.

(Li Salts-Type 1)

Suitable examples are complex salts of "Lewis Acid and LiF", such as $LiPF_6$, $LiAsF_6$, $LiSbF_6$, $LiPF_4(CF_3)_2$, $LiPF_3(C_2F_5)_3$, $LiPF_3(CF_3)_3$, $LiPF_3(iso-C_3F_7)_3$, and $LiPF_5(iso-C_3F_7)$. Preferable examples are $LiPF_6$, $LiBF_4$, and $LiAsF_6$. More preferable examples are $LiPF_6$ and $LiBF_4$.

(Li Salts-Type 2)

Suitable examples are "iminium lithium salts or methylated lithium salts", such as $LiN(SO_2F)_2$, $LiN(SO_2CF_3)_2$, $LiN(SO_2C_2F_5)_2$, $(CF_2)_2(SO_2)_2NLi$ (cyclic), $(CF_2)_3(SO_2)_2NLi$ (cyclic), and $LiC(SO_2CF_3)_3$. Preferable examples are $LiN(SO_2F)_2$, $LiN(SO_2CF_3)_2$, and $LiN(SO_2C_2F_6)_2$. More preferable examples are $LiN(SO_2F)_2$ and $LiN(SO_2CF_3)_2$.

(Li Salts-Type 3)

Suitable examples are "lithium salts containing a $S(=O)_2O$ structure", such as $LiSO_3F$, $LiCF_3SO_3$, $CH_3SO_4Li$, $C_2H_5SO_4Li$, $C_3H_7SO_4Li$, lithium trifluoro (methanesulfonyloxy) borate (LiTFMSB), and lithium pentafluoro (methanesulfonyloxy) phosphate (LiPFMSP). Preferable examples are $LiSO_3F$, $CH_3SO_4Li$, $C_2H_5SO_4Li$, and LiTFMSB.

(Li Salts-Type 4)

Suitable examples are "lithium salts containing P=O or Cl=O", such as $LiPO_2F_2$, $Li_2PO_3F$, and $LiClO_4$. Preferable examples are $LiPO_2F_2$ and $Li_2PO_3F$.

(Li Slats-Type 5)

Suitable examples are "lithium salts with oxalate ligands as anions", such as lithium bis[oxalate-O,O'] borate (LiBOB), lithium difluoro[oxlate-O,O'] borate, lithium difluorobis[oxlate-O,O'] phosphate (LiPFO), and lithium tetrafluoro[oxalate-O,O'] phosphate. Preferable examples are LiBOB and LiPFO. One or more of these lithium salts can be used in the electrolyte.

The lithium salt is preferably selected from the group consisting of $LiPF_6$, $LiPO_2F_2$, $Li_2PO_3F$, $LiBF_4$, $LiSO_3F$, lithium trifluoro((methanesulfonyloxy) borate (LiTFMSB), $LiN(SO_2F)_2$, $LiN(SO_2CF_3)_2$, $LiN(SO_2C_2F_6)_2$, lithium bis[oxalate-O,O'] borate (LiBOB), lithium difluorobis[oxalate-O,O'] phosphate (LiPFO), lithium tetrafluoro[oxalte-O,O'] phosphate, and combinations thereof; more preferably, selected from the group consisting of $LiPF_6$, $LiBF_4$, $LiSO_3F$, lithium trifluoro((methanesulfonyloxy) borate (LiTFMSB), $LiPO_2F_2$, $LiN(SO_2CF_3)_2$, $LiN(SO_2F)_2$, lithium bis[oxalate-O,O'] borate (LiBOB), lithium difluorobis[oxalate-O,O'] phosphate (LiPFO), and combinations thereof; and most preferably, is $LiPF_6$.

(Preparation of Electrolyte)

The electrolytes according to the embodiments of the present disclosure can be obtained by a method as described below, for example, mixing the above organic solvents, then adding an electrolyte salt and the multi-cyano six-membered N-heterocyclic compound according to the present disclosure into the mixed organic solvents, and optionally adding at least one of the above additives A.

(Synthesis of Multi-Cyano Six-Membered N-Heterocyclic Compounds)

(I) Preparation of Compounds Represented by Formula I-1:

A reaction equation of the synthesis of compounds represented by Formula I-1 is shown as below:

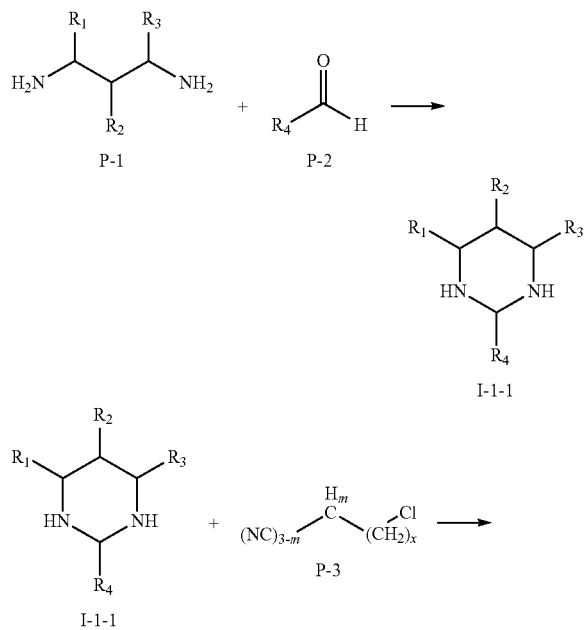

Specific steps of the preparation are as follow:

1. An aqueous solution of P-2 (concentration of 30-40%) was added dropwise to a raw material P-1 within 20-60 min while being stirred rapidly. After the dropwise addition was completed, the mixture was stirred rapidly for 15-30 h, and then refluxed and stirred for 3-5 h under temperature of 70-90° C. of oil bath. A colorless, fuming, and viscous liquid intermediate I-1-1 was obtained.

2. $K_2CO_3$, KI, and anhydrous acetonitrile were added subsequently, and stirred rapidly to form a solid-liquid mixture phase. A raw material P-3 was added quickly at 40-60° C., the mixture was further stirred for 10-20 h and then cooled to room temperature. A compound represented by Formula I-1 was obtained after separation and purification.

(II) Preparation of Compounds Represented by Formula I-2:

A reaction equation of the synthesis of compounds represented by Formula I-2 is shown as below:

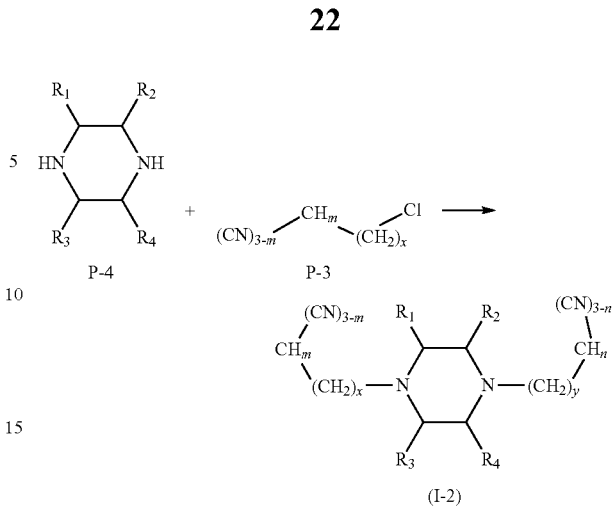

Specific steps of the preparation are as follow:

Anhydrous sodium carbonate, a raw material P-4 and a raw material P-3 were mixed in absolute ethanol, and were stirred to react for 2-5 h. The reaction mixture was washed for several times with hot ethanol to obtain a crude product, which was recrystallized to obtain a compound represented by Formula I-2.

(III) Preparation of Compounds Represented by Formula I-3:

A reaction equation of the synthesis of compounds represented by Formula I-3 is shown as below:

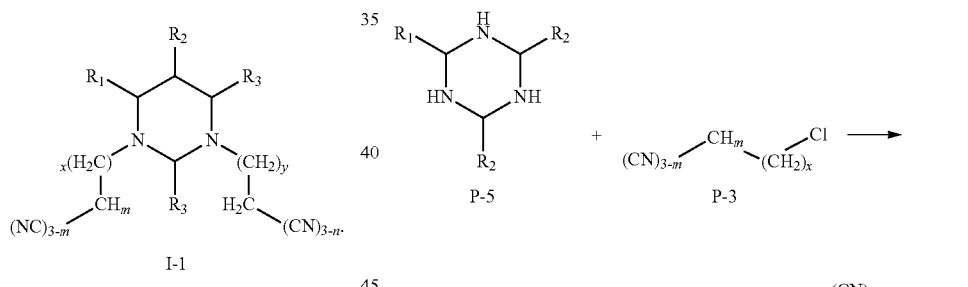

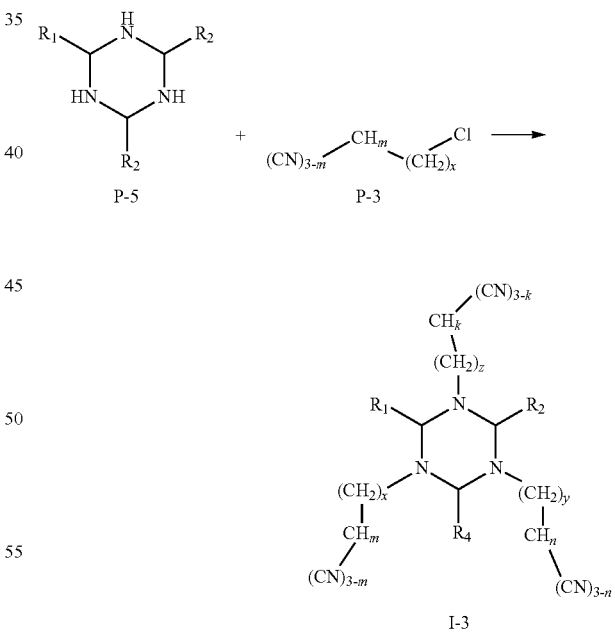

Specific steps of the preparation are as follow:

Anhydrous sodium carbonate, a raw material P-5 and a raw material P-3 were mixed in absolute ethanol and stirred to react for 2-5 h. The reaction mixture was washed for several times with hot ethanol to obtain a crude product, which was recrystallized to obtain a compound represented by Formula I-3.

Synthesis Example 1

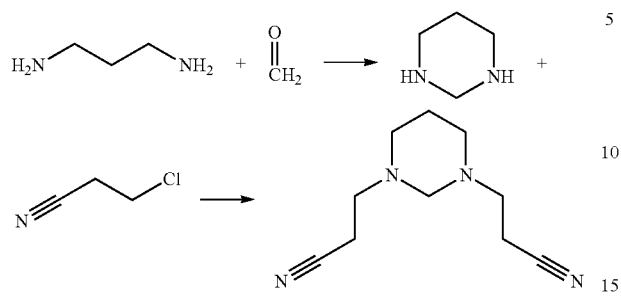

Aqueous solution of formaldehyde (1.37%) was added dropwise to 1,3-propanediamine within 0.5 h and stirred rapidly. After the dropwise addition was completed, the mixture was further stirred rapidly for 20 h, and refluxed and stirred at a temperature of 80° C. of oil bath for 4 h. A colorless, fuming and viscous liquid intermediate, hexahydropyrimidine, was obtained.

2. $K_2CO_3$, KI, and anhydrous acetonitrile were added subsequently. The mixture was stirred rapidly to form a solid-liquid mixture phase. p-chloropropionitrile was added within 0.5 h at a temperature of 60° C., then the reaction mixture was cooled to room temperature after being stirred for 17 h. A Compound A2 was obtained after separation and purification.

$^{13}$C-NMR of the Compound A2 is shown in FIG. 1.

Synthesis Example 2

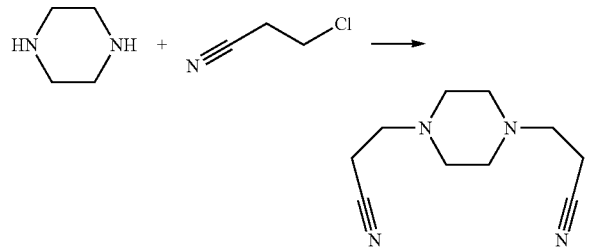

Anhydrous sodium carbonate, piperazine and p-chloropropionitrile were mixed in absolute ethanol, and stirred to react for 4 h. The reaction mixture was rinsed for several times with hot ethanol to obtain a crude product, which was recrystallized to obtain a Compound A8.

Figure 2:
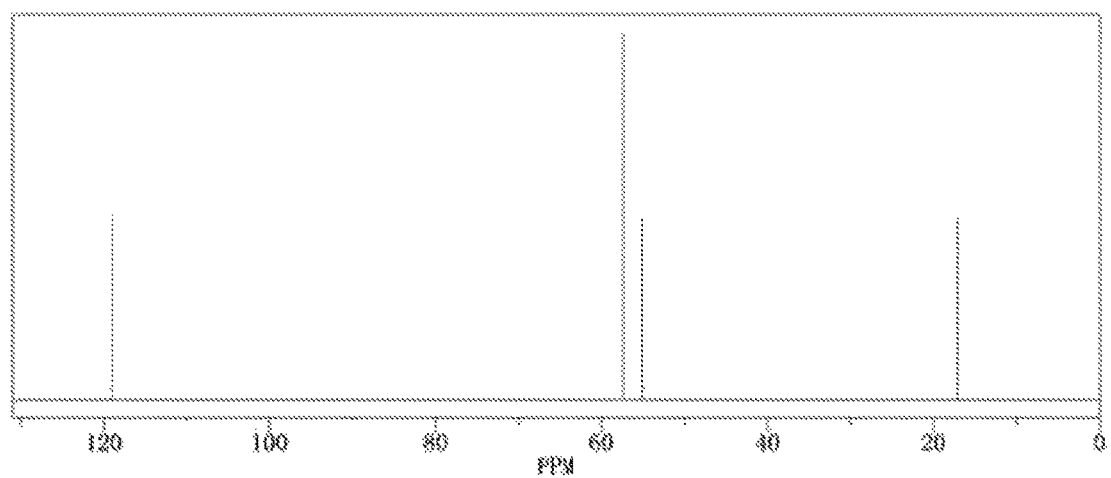
FIG. 2 is a nuclear magnetic resonance carbon spectrum of Compound A8.

$^{13}$C-NMR of the Compound A8 is shown in FIG. 2.

Synthesis Example 3

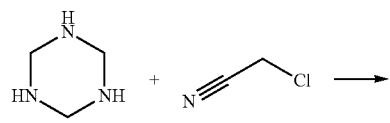

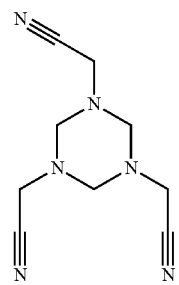

Anhydrous sodium carbonate, 1,3,5-s-triazine and chloroacetonitrile were mixed in absolute ethanol, and stirred to react for 4 h. The reaction mixture was rinsed for several times with hot ethanol to obtain a crude product, which was recrystallized to obtain a Compound A13.

Figure 3:
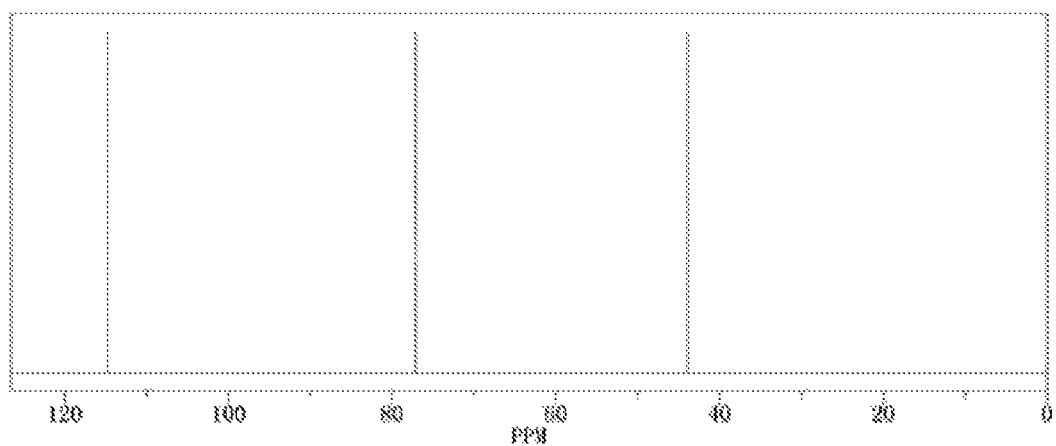
FIG. 3 is a nuclear magnetic resonance carbon spectrum of Compound A13.

$^{13}$C-NMR of the Compound A13 is shown in FIG. 3.

According to a second aspect of the present disclosure, a battery is described below.

The battery according to the embodiments of the present disclosure includes a positive electrode plate, a negative electrode plate, a separator disposed between the positive electrode plate and the negative electrode plate, and an electrolyte. It should be noted that the battery according to the embodiments of the present disclosure can be a lithium-ion battery, a sodium-ion battery or a magnesium-ion battery.

When the battery is a lithium-ion battery, the positive electrode plate thereof includes a positive electrode active material capable of de-intercalating and intercalating lithium ions, and the negative electrode plate thereof includes a negative electrode active material capable of intercalating and de-intercalating lithium ions.

Specifically, when the battery is a lithium-ion battery, the positive electrode active material can be selected from the group consisting of lithium cobalt oxide, lithium nickel oxide, lithium manganese oxide, lithium nickel manganese oxide, lithium nickel cobalt manganese oxide, lithium nickel cobalt aluminum oxide, a compound formed by doping a transition metal or a non-transition metal into the lithium transition metal oxides, and combinations thereof. The positive electrode active material can be a layered lithium-containing oxide, a spinel-type lithium-containing oxide, an olivine-type lithium-containing phosphate compound or the like. However, the positive electrode active material is not limited to the above materials. Any conventional material that can be used as a positive electrode active material of a lithium-ion battery can be adopted. These positive electrode active materials can be used individually or in combination.

Specifically, when the battery is a lithium-ion battery, the negative electrode active material can be soft carbon, hard carbon, artificial graphite, natural graphite, silicon, silicon oxide, silicon carbon composite, lithium titanate, metal capable of forming an alloy with lithium, or the like. Specifically, a carbon-based negative electrode, a silicon-based negative electrode, a tin-based negative electrode, or the like can be used. However, the negative electrode active material is not limited to these materials. Any conventional material that can be used as a negative electrode active material of a lithium-ion battery can be adopted. These negative electrode active materials can be used individually or in combination.

When the battery is a sodium-ion battery, the positive electrode plate thereof includes a positive electrode active material capable of de-intercalating and intercalating sodium ions, and the negative electrode thereof includes a negative electrode active material capable of intercalating and de-intercalating sodium ions. For example, the positive electrode active material can be selected from the group consisting of sodium iron composite oxide ($NaFeO_2$), sodium cobalt composite oxide ($NaCoO_2$), sodium chromium composite oxide ($NaCrO_2$), sodium manganese composite oxide ($NaMnO_2$), sodium nickel composite oxide ($NaNiO_2$), sodium nickel titanium composite oxide ($NaNi_{1/2}Ti_{1/2}O_2$), sodium nickel manganese composite oxide ($NaNi_{1/2}Mn_{1/2}O_2$), sodium iron manganese composite oxide ($Na_{2/3}Fe_{1/3}Mn_{2/3}O_2$), sodium nickel cobalt manganese composite oxide ($NaNi_{1/3}Co_{1/3}Mn_{1/3}O_2$), sodium iron phosphate compound ($NaFePO_4$), sodium manganese phosphate compound ($NaMnPO_4$), sodium cobalt phosphate compound ($NaCoPO_4$), and the like, but is not limited thereto. Any conventional materials that can be used as a positive electrode active material of a sodium-ion battery can be adopted. The positive electrode active material can be used individually or in combination.

The negative electrode active material of the sodium-ion battery can be a carbon material, such as hard carbon, natural graphite, artificial graphite, soft carbon, carbon black, acetylene black, carbon nanotubes, graphene, carbon nanofibers, etc. In addition, other suitable negative electrode active materials are, for example, elementary substances of elements that are alloyed with sodium such as Si, Ge, Pb, In, Zn, H, Ca, Sr, Ba, Ru, Rh, etc., oxides thereof or carbides thereof, but are not limited thereto. Any conventional material that can be used as a negative electrode active material of a sodium-ion battery can be adopted. These negative electrode active materials can be used individually or in combination.

When the battery is a magnesium-ion battery, the positive electrode plate thereof includes a positive electrode active material capable of de-intercalating and intercalating magnesium ions, and the negative electrode plate thereof includes a negative electrode active material capable of intercalating and de-intercalating magnesium ions. For example, the positive electrode active material can be selected from the group consisting of $V_2O_5$, $MoO_3$, $MnO_2$, $TiS_2$, $MoS_2$, and the like, and the negative electrode active material can be selected from the group consisting of magnesium metal, magnesium alloy, graphite, and the like. However, the embodiments of the present disclosure are not limited to these materials. Any conventional materials which can be used as positive or negative electrode active materials of a magnesium-ion batteries can be adopted. The positive or negative electrode active materials can be used individually or in combination.

In the above-mentioned battery, the separator is not specifically limited, and can be any separator material used in the existing batteries, such as polyethylene, polypropylene, polyvinylidene fluoride, and a multilayered composite film thereof, but is not limited thereto.

The electrolyte of the battery is the electrolyte according to the first aspect of the present disclosure.

In the above-mentioned battery, the positive electrode plate further includes a binder and a conductive agent. A positive electrode slurry containing the positive electrode active material, the binder and the conductive agent is coated on a positive current collector and then dried to obtain the positive electrode plate. Similarly, a negative electrode slurry containing the negative electrode active material, a binder and a conductive agent is coated on a negative current collector, and then dried to obtain the negative electrode plate.

Further, a charging cutoff voltage of the battery according to the embodiments of the present disclosure is not less than 4.2V. That is, the battery can operate in a range of 4.2V to 4.9V, preferably in a range of 4.3V to 4.8V. In a high voltage state, the higher the valence state of the surface transition metal of the positive electrode material, the stronger the coulomb interaction of the cyanos in the additive, i.e., the stronger the protective effect the additive can provide.

EXAMPLES

The following specific examples of the present disclosure merely illustrate the embodiments of the lithium-ion battery, but the present disclosure is not limited thereto. The present disclosure is described in detail in combination with the examples of the lithium-ion battery. It should be understood that these examples are merely used to illustrate the present disclosure, but not intended to limit the scope of the present disclosure. The reagents, materials and instruments used in the following examples and comparative examples are commercially available, unless otherwise specified.

Preparation of Electrolyte: A mixture of ethylene carbonate (EC), ethyl methyl carbonate (EMC) and diethyl carbonate (DEC) was used as solvent, in which a mass ratio of EC, EMC and DEC is 1:1:1. $LiPF_6$ was used as the lithium salt, and a total content of $LiPF_6$ is 12.5% of a total weight of the electrolyte. The additive is added to the composition of the electrolyte shown in Table 1 is added, in which the concentrations of the additive are ratios of the weight of the additive to the total weight of the electrolyte.

Preparation of Positive Electrode Plate: $LiCoO_2$ used as the positive electrode active material, PVDF used as the binder, and acetylene black used as the conductive agent were mixed in a mass ratio of 98:1:1, and then N-methyl-pyrrolidone was added. The mixture was stirred with a vacuum mixer until a stable and uniform positive electrode slurry was obtained. The positive electrode slurry was uniformly coated on an aluminum foil. The aluminum foil was dried in the air at room temperature, transferred to a blast oven and dried there at 120° C. for 1 h, following by cold pressing and cutting, so as to obtain a positive electrode plate.

Preparation of Negative Electrode Plate: Graphite used as the negative electrode active material, acetylene black used as the conductive agent, carboxymethyl cellulose sodium (CMC) solution used as a thickener, and styrene-butadiene rubber emulsion used as the binder were mixed in a mass ratio of 97:1:1:1, and then deionized water was then added. The mixture was stirred with a vacuum mixer until a stable and uniform negative electrode slurry was obtained. The negative electrode slurry was uniformly coated on a copper foil. The copper foil was dried in the air at room temperature, transferred to a blast oven and dried there at 120° C. for 1 h, following by cold pressing and cutting, so as to obtain a negative electrode plate.

Preparation of Battery: The positive electrode plate, the negative electrode plate and a PP/PE/PP separator were wound to obtain a cell. After the cell had been placed in a package shell, the electrolyte was injected, and the package shell was sealed. Through subsequent procedures such as storing, hot and cold pressing, formation, air exhausting, capacitance test, a lithium-ion battery was obtained.

In Table 1, the concentration of respective multi-cyano six-membered N-heterocyclic compound is in percentage by weight based on a total weight of the electrolyte.

TABLE 1

Components and proportion of components
in the electrolyte of Batteries 1-18

| No. | solvent | multi-cyano six-membered N-heterocyclic compounds type | concentration |
|---|---|---|---|
| Battery 1 | EC:EMC:DEC = 1:1:1 | A1 | 0.001% |
| Battery 2 | EC:EMC:DEC = 1:1:1 | A2 | 0.1% |
| Battery 3 | EC:EMC:DEC = 1:1:1 | A3 | 0.5% |
| Battery 4 | EC:EMC:DEC = 1:1:1 | A5 | 1.0% |
| Battery 5 | EC:EMC:DEC = 1:1:1 | A7 | 1.5% |
| Battery 6 | EC:EMC:DEC = 1:1:1 | A8 | 2.0% |
| Battery 7 | EC:EMC:DEC = 1:1:1 | A1 | 2.0% |
| Battery 8 | EC:EMC:DEC = 1:1:1 | A9 | 2.5% |
| Battery 9 | EC:EMC:DEC = 1:1:1 | A10 | 3.0% |
| Battery 10 | EC:EMC:DEC = 1:1:1 | A13 | 3.5% |
| Battery 11 | EC:EMC:DEC = 1:1:1 | A14 | 4.5% |
| Battery 12 | EC:EMC:DEC = 1:1:1 | A15 | 6% |
| Battery 13 | EC:EMC:DEC = 1:1:1 | A18 | 8% |
| Battery 14 | EC:EMC:DEC = 1:1:1 | A1 | 9% |
| Battery 15 | EC:EMC:DEC = 1:1:1 | A1 | 10.0% |
| Battery 16 | EC:EMC:DEC = 1:1:1 | A1 | 11.0% |
| Battery 17 | EC:EMC:DEC = 1:1:1 | — | — |
| Battery 18 | EC:EMC:DEC = 1:1:1 | adiponitrile | 2.0% |

The following tests were conducted on Batteries 1-18:

(1) Cycle Performance Test of Lithium-Ion Batteries at High Voltage

At 25° C., the lithium-ion secondary battery was firstly charged with a constant current of 1 C to a voltage of 4.35 V, further charged at a constant voltage of 4.35 V until the current was 0.05 C, and then discharged at a constant current of 1 C to a voltage of 3.0 V. This procedure is called as one charge and discharge cycle, and a discharge capacitance during this first cycle was referred to as a discharge capacitance of the 1$^{st}$ cycle. The lithium-ion battery was subjected to 200 charge and discharge cycles according to the above procedure, and the discharge capacitance of the 200$^{th}$ cycle was measured.

Capacitance retention rate (%) of the lithium-ion battery after 200 cycles=(discharge capacitance of the lithium-ion battery in the 200$^{th}$ cycle/discharge capacity of the lithium-ion battery in the 1$^{st}$ cycle)×100%.

(2) Cycle Performance Test of Lithium-Ion Batteries at High Temperature and High Voltage At 45° C., the lithium-ion battery was firstly charged with a constant current of 1 C to a voltage of 4.35 V, further charged at a constant voltage of 4.35 V until the current was 0.05 C, and then discharged at a constant current of 1 C to a voltage of 3.0 V. This procedure was called as one charge and discharge cycle, and a discharge capacitance during this first cycle was referred to as a discharge capacitance of the 1$^{st}$ cycle. The lithium-ion battery was subjected to 200 charge and discharge cycles according to the above procedure, and the discharge capacitance of the 200$^{th}$ cycle was measured.

Capacitance retention rate (%) of the lithium-ion battery after 200 cycles=(discharge capacitance of the lithium-ion battery in the 200$^{th}$ cycle/discharge capacity of the lithium-ion battery in the 1$^{st}$ cycle)×100%.

(3) Storage Performance Test of Lithium-Ion Batteries at High Temperature

At 85° C., the lithium-ion battery was charged with a constant current of 0.5 C to a voltage of 4.35 V, and then charged at a constant voltage of 4.35 V until the current was 0.05 C; at this time, the thickness of the lithium-ion battery was measured and recorded as h0. The lithium-ion battery was then placed in an incubator at 85° C., stored for 24 hours and then taken out; at this time, the thickness of the lithium-ion battery was measured and recorded as h1.

Thickness expansion ratio of the lithium-ion battery after 24 h storage (%)=[(h1−h0)/h0]×100%.

TABLE 2

Test results of cycle capacitance retention rate
and thicknessexpansion ratio

| No. | 25° C./4.35V/ capacitance retention rate after 200 cycles | 45° C./4.35V/ capacitance retention rate after 200 cycles | thickness expansion ratio after 24h storage at 85° C. |
|---|---|---|---|
| Battery 1 | 88% | 86% | 39% |
| Battery 2 | 91% | 88% | 30% |
| Battery 3 | 94% | 91% | 16% |
| Battery 4 | 96% | 93% | 10% |
| Battery 5 | 97% | 95% | 7% |
| Battery 6 | 97% | 94% | 4% |
| Battery 7 | 99% | 97% | 3% |
| Battery 8 | 99% | 96% | 5% |
| Battery 9 | 97% | 96% | 3% |
| Battery 10 | 98% | 97% | 3% |
| Battery 11 | 96% | 95% | 4% |
| Battery 12 | 93% | 92% | 1% |
| Battery 13 | 90% | 88% | 3% |
| Battery 14 | 92% | 90% | 2% |
| Battery 15 | 90% | 86% | 2% |
| Battery 16 | 87% | 83% | 2% |
| Battery 17 | 83% | 75% | 67% |
| Battery 18 | 95% | 91% | 12% |

As shown in the above table, the capacitance retention rate of the lithium-ion battery is used to evaluate the cycle performance at high voltage and high temperature, and the thickness expansion ratio of the lithium-ion battery is used to evaluate the storage performance at high temperature.

Comparing Batteries 1-16 with Battery 17, it can be seen that the multi-cyano six-membered N-heterocyclic compound added into the electrolyte of lithium-ion batteries can effectively improve the cycle performance of lithium-ion batteries at high voltage and high temperature. The mechanism mainly lies in that: the multi-cyano six-membered N-heterocyclic compound molecule contains two or more cyanos at the same time, the nitrogen atom in respective cyano contains lone pair electrons, which can be strongly complexed with the 3d empty orbit of the surface transition metal of the positive electrode material. In this way, the surface activity of the positive electrode plate is reduced, while the surface of the positive electrode plate (especially at high SOC) is prevented from directly contacting the electrolyte. Therefore, side reaction at the surface of the positive electrode plate is significantly reduced, and thus less lithium ions are consumed in the side reaction, i.e., the consumption rate of the reversible lithium ions is greatly reduced, which results in a significantly enhanced cycle capacitance retention rate. In addition, since part of the side reactions on surface can generate gas, the reduction of surface side reactions means a decrease in gas production, and thus the thickness expansion effect of the battery at high temperature is significantly alleviated.

It can be seen from the Batteries 1-16 and Battery 17 that, after 0.001% multi-cyano six-membered N-heterocyclic compound is added in the electrolyte of the lithium-ion battery, the storage performance of the Battery 17 at high temperature is improved to a certain extent; when the mass percent of the multi-cyano six-membered N-heterocyclic compounds in the electrolyte is increased to 2%, the cycle performance at high temperature and high voltage, and storage performance of the lithium-ion batteries are effectively improved; when the mass percent of the multi-cyano six-membered N-heterocyclic compounds in the electrolyte is increased to 10%, a thick complex layer can be formed, which can greatly suppress the occurrence of side reaction on the surface of the positive electrode material, further reduce the thickness expansion ratio, and significantly improve the storage performance at high-temperature; when the mass percentage of the multi-cyano six-membered N-heterocyclic compounds in the electrolyte is further increased to 11%, the complex layer formed on the surface of the positive electrode material is too thick and too dense due to a high addition amount, which on the one hand negatively affects the diffusion and migration of lithium ions, and on the other hand, leads to an increased viscosity of the electrolyte, and a declined ion conductivity, so that the cycle performance of the lithium battery at high temperature and high voltage tends to decline.

Compared with the Battery 18 that adopts linear adiponitrile, a distance between cyano groups in the multi-cyano six-membered N-heterocyclic molecules is more approximate to a distance between transition metals on the surface of the layered positive electrode material due to the ring structure, so that all of the cyano groups in the molecules can participate in complexation. In this way, an efficiency of passivating the surface of the positive electrode material is enhanced, a better covering effect on the surface transition metals than that of the adiponitrile can be achieved. Therefore, the multi-cyano six-membered N-heterocyclic compounds can provide a significant improvement effect on the cycle and storage performance of the battery.

According to the disclosure and teachings of the foregoing description, those skilled in the art can also make appropriate changes and modifications to the embodiments described above. Therefore, the present disclosure is not limited to the specific embodiments disclosed and described above, and some modifications and variations shall fall within the scope of the claims. In addition, although some specific terms used in the specification are merely for convenience of description and do not constitute any limitation.

What is claimed is:

1. A battery, comprising:
a positive electrode plate;
a negative electrode plate;
a separator disposed between the positive electrode plate and the negative electrode plate; and
an electrolyte, comprising an additive, wherein the additive is selected from a group consisting of multi-cyano six-membered N-heterocyclic compounds represented by Formula I-1, Formula I-3, and combinations thereof,

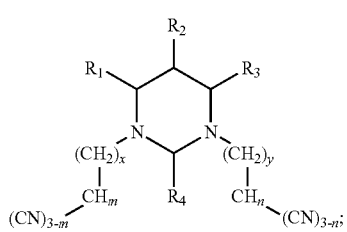

(I-1)

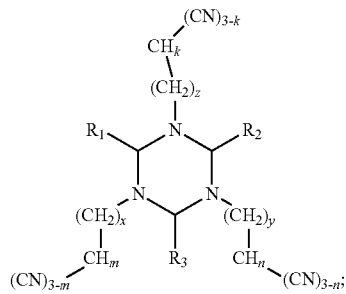

wherein $R_1$, $R_2$, $R_3$ and $R_4$ are each independently selected from a group consisting of hydrogen, halogen, substituted or unsubstituted $C_1$-$C_{12}$ alkyl, substituted or unsubstituted $C_1$-$C_{12}$ alkoxy, substituted or unsubstituted $C_1$-$C_{12}$ amine group, substituted or unsubstituted $C_2$-$C_{12}$ alkenyl, substituted or unsubstituted $C_2$-$C_{12}$ alkynyl, substituted or unsubstituted $C_6$-$C_{26}$ aryl, and substituted or unsubstituted $C_4$-$C_{12}$ heterocyclic group;
the substituent for the above groups, if present, is independently selected from a group consisting of halogen, cyano, $C_1$-$C_6$ alkyl, $C_2$-$C_6$ alkenyl, $C_1$-$C_6$ alkoxy, and combinations thereof;
x, y and z are each an integer independently selected from 0-8; and
m, n and k are each an integer independently selected from 0-2.

2. The battery according to claim 1, wherein
$R_1$, $R_2$, $R_3$ and $R_4$ are each independently selected from a group consisting of hydrogen, halogen, substituted or unsubstituted $C_1$-$C_3$ linear or branched alkyl, substituted or unsubstituted $C_5$-$C_7$ cycloalkyl, substituted or unsubstituted $C_1$-$C_3$ alkoxy, substituted or unsubstituted $C_1$-$C_3$ amine group, substituted or unsubstituted $C_2$-$C_3$ alkenyl, substituted or unsubstituted $C_2$-$C_3$ alkynyl, substituted or unsubstituted $C_6$-$C_8$ aryl, and substituted or unsubstituted $C_4$-$C_7$ heterocyclic group,
the substituent for the above groups, if present, is halogen.

3. The battery according to claim 1, wherein m, n and k are each independently 1 or 2.

4. The battery according to claim 1, wherein
in Formula I-1, $R_1$ and $R_3$ are identical; and
in Formula I-3, at least two of $R_1$, $R_2$ and $R_3$ are identical.

5. The battery according to claim 4, wherein
in Formula I-1, $R_1$ and $R_3$ are hydrogen; and
in Formula I-3, at least two of $R_1$, $R_2$ and $R_3$ are hydrogen.

6. The battery according to claim 1, wherein the electrolyte comprises 0.001% to 10% by weight of the multi-cyano six-membered N-heterocyclic compound.

7. The battery according to claim 1, wherein the multi-cyano six-membered N-heterocyclic compound represented by Formula I-1 is selected from a group consisting of the following compounds and combinations thereof: and

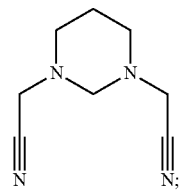

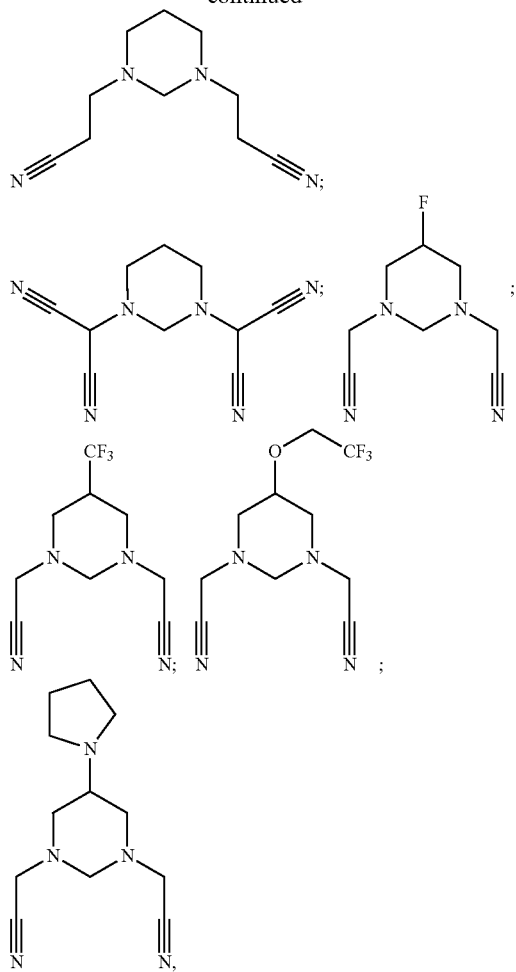

the multi-cyano six-membered N-heterocyclic compound represented by Formula I-3 is selected from a group consisting of the following compounds and combinations thereof:

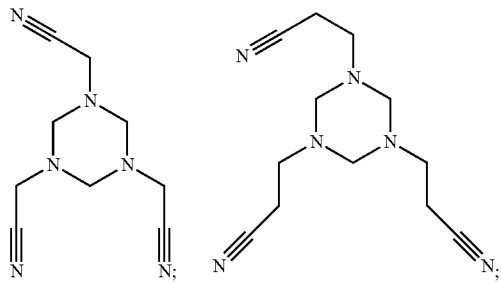

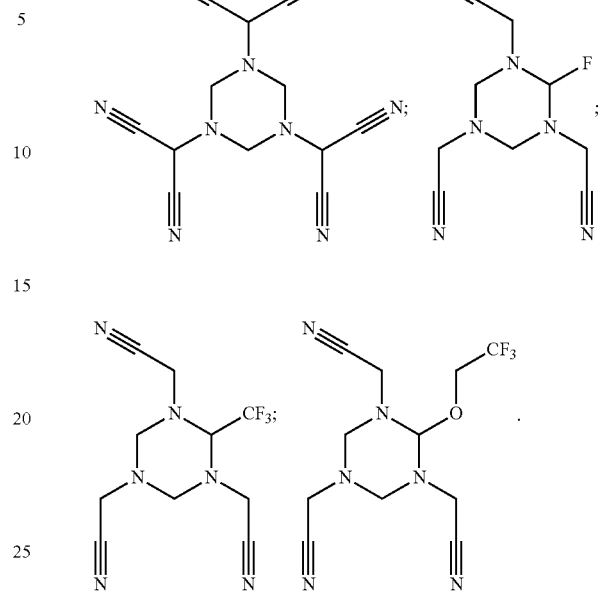

8. The battery according to claim 1, further comprising an additive A, wherein the additive A is selected from a group consisting of an unsaturated bond-containing cyclic carbonate compound, a halogenated cyclic carbonate compound, a sulfate compound, a sulfite compound, a sultone compound, a disulphonic acid compound, a nitrile compound, an aromatic compound, an isocyanate compound, a phosphazene compound, a cyclic anhydride compound, a phosphite ester compound, a phosphate ester compound, a boric acid ester compound, a carboxylate compound, and combinations thereof.

9. The battery according to claim 8, wherein the electrolyte comprises 0.01% to 30% by weight of the additive A.

10. The battery according to claim 1, wherein the battery is a lithium-ion battery, a sodium-ion battery or a magnesium-ion battery.

11. The battery according to claim 1, wherein the battery is a lithium-ion battery, and a charge cut-off voltage of the battery is not less than 4.2V.

12. The battery according to claim 1, wherein the electrolyte comprises 0.1% to 3.5% by weight of the multi-cyano six-membered N-heterocyclic compound.

\* \* \* \* \*